(12) United States Patent
Alfonso et al.

(10) Patent No.: US 7,272,184 B2
(45) Date of Patent: Sep. 18, 2007

(54) PROGRAMMABLE SYSTEM FOR MOTION VECTOR GENERATION

(75) Inventors: Daniele Alfonso, Monza (IT); Fabrizio Rovati, Cinisello Balsamo (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 859 days.

(21) Appl. No.: 10/456,985

(22) Filed: Jun. 5, 2003

(65) Prior Publication Data

US 2004/0190620 A1 Sep. 30, 2004

(30) Foreign Application Priority Data

Jun. 7, 2002 (EP) .................................. 02425372

(51) Int. Cl.
*H04B 1/66* (2006.01)

(52) U.S. Cl. ................................................. 375/240.16
(58) Field of Classification Search ........... 375/240.15, 375/240.16, 240.17; *H04B 1/66*
See application file for complete search history.

(56) References Cited

U.S. PATENT DOCUMENTS

| 5,379,351 | A | * | 1/1995 | Fandrianto et al. | ......... | 382/236 |
| 5,510,857 | A | | 4/1996 | Kopet et al. | ................. | 348/699 |
| 5,901,248 | A | | 5/1999 | Fandrianto et al. | ......... | 382/236 |
| 6,724,823 | B2 | * | 4/2004 | Rovati et al. | .......... | 375/240.17 |
| 6,868,123 | B2 | * | 3/2005 | Bellas et al. | ........... | 375/240.16 |
| 7,126,991 | B1 | * | 10/2006 | Mimar | ................... | 375/240.16 |

FOREIGN PATENT DOCUMENTS

| EP | 0 395 293 A1 | 10/1990 |
| EP | 1 1319 669 A1 | 4/2001 |

OTHER PUBLICATIONS

Charlot, D. et al., "A Risc Controlled Motion Estimation Processor for MPEG-2 and HDTV Encoding," in *Proceedings of the Acoustics, Speech, and Signal Processing International Conference*, Detroit, MI, May 9-12, 1995, pp. 3287-3290, XP 000691459.
Lin, H-D. et al., "A 14-Gops Programmable Motion Estimator for H.26X Video Coding," *IEEE Journal of Solid-State Circuits* 31(11), Nov. 1996, pp. 1742-1750.
Lin, H-D. et al., "FP 15.3: A 14GOPS Programmable Motion Estimator for H.26x Video Coding," in *Proceedings of the IEEE International Solid State Circuits Conference*, New York, US, Session 15, Feb. 1, 1996, pp. 246-247, and 454, XP 000685615.
Saha, A. et al., "Paralell Programmable Algorithm and Architecture for Real-Time Motion Estimation of Various Video Applications," *IEEE Transactions on Consumer Electronics* 41(4), Nov. 1995, pp. 1069-1079, XP 000553483.

* cited by examiner

*Primary Examiner*—Tung Vo
(74) *Attorney, Agent, or Firm*—Lisa K. Jorgenson; Robert Iannucci; Seed IP Law Group PLLC

(57) ABSTRACT

A system for generating motion vectors in a motion estimator is configured for co-operating with an engine for calculating estimation error for generating motion vectors, according to estimation errors and/or motion vectors previously generated. The system comprises a program memory that contains program data for a motion-estimation algorithm, and a motion-vector memory that contains data identifying said motion vectors previously calculated. The system further comprises an arithmetic and logic unit co-operating with the program memory and motion-vector memory to generate motion vectors in a programmable way to get them to correspond, for example, to predictors deriving from motion-estimation operations already performed on the macroblocks of the reference frame or on the previous macroblocks of the current frame, as updates calculated using the co-ordinates of the motion vectors already issued for the current macroblock, or as absolute motion vectors, generated as such, taking the components directly from the program code.

21 Claims, 5 Drawing Sheets

PROGRAMMABLE SYSTEM FOR MOTION VECTOR GENERATION

BACKGROUND OF THE INVENTION

1. Field of the Invention

The present invention relates to systems for generating motion vectors and has been developed with particular attention paid to its possible application in the framework of techniques for encoding digital video signals.

2. Description of the Related Art

Techniques for coding digital video signals aim at minimizing the memory occupied and/or the bandwidth required for storage/transmission of video sequences. The techniques reduce the temporal and spatial redundancy of the images (frames) that make up the sequence. Temporal redundancy is due to the correlation existing between successive frames of the sequence, whilst spatial redundancy is due to the correlation existing between samples (pixels or pels) of each image of the sequence.

Temporal redundancy is minimized by resorting to techniques of motion estimation based upon the hypothesis that each frame may be expressed locally as a translation of a preceding and or subsequent frame in the sequence.

Spatial redundancy is, instead, minimized by low-pass filtering and entropic encoding.

The diagram of FIG. 1 illustrates, in the form of a block diagram, the generic structure of a video encoder, designated, as a whole, by 10 and designed to produce, starting from the frames F at input, an encoded sequence ES at output.

The first block on the top left is the motion estimator, designated by 12, which has the task of minimizing the temporal redundancy between the current frame and the previous or subsequent frames stored in a frame-buffer memory designated by 14. The motion-estimation block 12 is followed by a block 16, which performs a transformation or transform designed to transfer the values of the pixels into the frequency domain. The values thus obtained are then quantized in a quantizer block designated by 18 to obtain a low-pass filtering effect, and the result is finally encoded on the basis of a variable-length code (VLC) into an encoding block, designated by 20.

The quantization step is calculated by the rate-controller block 22 according to the degree of occupation that it is desired to achieve in an output buffer memory designated by 24 and designed to supply the encoded sequence at output.

The quantized values are then subjected to an inverse quantization, carried out in a block designated by 26, followed by an inverse transform performed in a block designated by 28, the aim being to enable storage in the buffer memory 14, not of the original frames, but of the ones on which the video encoder is to operate during the decoding step.

As has already been said, motion estimation is the tool that enables elimination of the temporal redundancy between successive frames in a video sequence during the process of encoding of the digital video signal. This is done by dividing each frame into regions of luminance pixels (referred to as macroblocks), then expressing each macroblock as a difference with respect to a similar region in the preceding and/or subsequent frames by means of a displacement vector (or motion vector) associated with a prediction error given by the difference between the current macroblock of the frame and the region to which the motion vector points (the motion vector being known as "predictor"). In order to minimize the bit rate of the encoded video sequence ES, the prediction error (also referred to as "estimation error" or "matching error") must be as small as possible. This can be evaluated using, for example, mean square error (MSE), or else by the sum of the absolute differences (SAD).

For example, if the macroblock is a square region consisting of 16×16 pixels, the SAD is defined as described as follows.

Suppose that SAD (x, y) is the sum of the absolute differences between a macroblock in the position (x, y) in the n-th reference frame, with pixels of intensity $V_n(x+i, y+j)$, and a corresponding macroblock in the position (x+dx, y+dy) in the m-th frame, which has pixels of intensity $V_m(x+dx+i, y+dy+j)$; then $$SAD(x,y) = \Sigma_{i=0}^{15} \Sigma_{j=0}^{15} |V_n(x+i,y+j) ? V_m(x+dx+i, y+dy+j)|$$

A motion estimator of a generic type operates in the following way.

In the first place, it receives the data of the current macroblock CMB, generating the motion vectors to be examined for the current macroblock.

It fetches the data for the previous frame and/or the subsequent frames to which the motion vectors point, then aligns them and performs, if necessary, an interpolation of a sub-pixel type, thus constructing the predictor for each motion vector.

The estimator then calculates the prediction error for each motion vector, calculating the estimation error between the data of the current macroblock CMB and the predictor. After checking all the motion vectors, it chooses the one or the ones with the lowest estimation error, issuing it or them at output together with the associated predictor.

The motion-estimation function is a highly repetitive task and one with a high computational intensity. This explains why, in a digital video encoder, this function is performed usually by a dedicated co-processor, referred to as motion estimator.

A co-processor of this sort in general has a structure of the type of the one represented in FIG. 2 and comprising two main blocks.

The first block, which constitutes the motion-vector generator designated by 30, generates the motion vectors MV that are to undergo testing on the basis of the chosen motion-estimation algorithm.

The second block, designated by 32, is basically an engine for calculating the estimation error, which is to calculate the estimation error between the information regarding the current macroblock CMB and the predictor P to which the motion vector being tested points.

Once again in the diagram of FIG. 2, there is visible, at output from the engine for calculating estimation error 32, the line on which there is or are available the motion vector or vectors considered as winners, following upon the test; the said winning motion vectors, designated as WMV, are to function as new predictors P. The feedback information on the estimation errors ME and the motion vectors MV is sent back by the engine 32 to the generator 30 by means of the line designated by ME, MV.

In current hardware implementations, the first block 30 is usually built resorting to a solution of the hard-wired type.

Instead, as regards the motion-vector generator 32, it is possible to choose between a hardware implementation and a software implementation.

In the first case, the motion-vector generator 30 also has a hard-wired configuration which ensures high efficiency, a reduced area of occupation of silicon, and the possibility of functioning with a low power absorption. The main drawback is represented by the fact that this solution does not provide any margin of flexibility.

In the case of an implementation purely at a software level, the motion-estimation algorithm is executed on a dedicated CPU core which can be formed, for example, by a digital processor of the DSP type. This choice ensures the maximum level of flexibility, given that the CPU is completely programmable. The drawback of this solution is that it may prove rather slow and affected by a high power absorption if compared to a hardware solution.

BRIEF SUMMARY OF THE PRESENT INVENTION

An embodiment of the present invention provides a solution capable of combining the advantages of both of the solutions described previously, at the same time overcoming the drawbacks presented by each of these solutions, thus being able to ensure both a high efficiency and a considerable degree of flexibility.

An embodiment according to the invention is a system architecture of a programmable type, which can be used to provide a co-processor with a motion-estimating function for encoding purposes and for digital video signals. As compared to the solutions known to the prior art, the embodiment provides an ideal synthesis between the requirements of flexibility, speed, power absorption and occupation of area on the silicon.

The co-processor architecture is able to provide, at a hardware level the motion-estimation solutions described, for instance, in EP-A-0 917 363, EP-A-0 944 245, EP-A-1 152 621 or in the European patent application 00830604.5, each of which is incorporated herein by reference.

The architecture can generate three types of motion vectors, referred to as predictors, updates, and absolute-motion vectors.

Predictors are the vectors that result from the motion-estimation function already provided on the macroblocks of the reference frames or on the previous macroblocks of the current frame, the above being in accordance with the criteria illustrated more clearly in FIG. 3, where the references RF and CF designate the reference frame and the current frame, respectively.

In the reference frame RF, the temporal predictors are designated, as a whole, by T, the left-hand temporal predictor being identified by LT, and the upper temporal predictor being identified by UT, with respect to the homologous temporal predictor HT.

In the current frame CF, the spatial predictors are indicated by S, the upper spatial predictor being identified by US, with respect to the current macroblock CMB.

The predictors are stored in a memory inside the motion-vector generating block itself. Each motion vector has two components, one for the horizontal direction and one for the vertical direction, and each component is expressed by sub-pixel co-ordinates.

Whenever a motion vector is issued, it passes through the engine for calculating the adaptation error, which returns the best motion vector so far identified, together with the associated estimation error. These values are stored inside the motion-vector generator.

The updates are calculated using as reference the co-ordinates of the motion vectors already issued for the current macroblock and then adding a relative displacement.

Finally, the motion vectors of an absolute type are issued just as they are, taking the components directly from the program code.

The motion-vector generator can be decoupled from the rest of the motion estimator. This means that it can issue a lot of motion vectors, one after another, and then receive all the results. Since the motion vectors having update character are calculated on the basis of the motion vectors previously issued, a mechanism is provided for synchronizing the two blocks of the motion estimator by means of two counters, which store the number of motion vectors issued, as well as the number of results received by the controller of the motion vectors. The synchronization function or the architecture of the set of instructions blocks the stage until the two counters reach the same value.

Before issuing a motion vector, the motion-vector generator makes sure that it is a valid vector, i.e., it verifies whether the vector violates the field allowed. If it does, the vector is subjected to clipping.

The dimensions of the frames and of the search window are stored in the internal registers. If the dimensions of the frame are known, the motion-vector generator is able to know the number of macroblocks contained in each frame and, by means of an internal counter, is able to know the position of current-macroblock data within the frame. This information is used for possibly clipping a motion vector within the frame and determining the effective existence of the predictors for the current macroblock. This is done, for example, since a macroblock located in the first section of the frame does not have a predictor in an upper position. If a predictor does not exist in actual fact, it is simply skipped, and the program counter moves on to the next instruction without incrementing the counter of the motion-vectors issued.

The components of the motion vectors are sent out, together with the co-ordinates of the current macroblock CMB. An output signal that is particularly important for the motion vector generator is represented by the control word used for driving the behavior of the engine for calculating estimation error.

BRIEF DESCRIPTION OF THE DRAWINGS

The invention will now be described, purely by way of non-limiting example, with reference to the annexed drawings, in which.

DETAILED DESCRIPTION OF THE INVENTION

Figure 1:
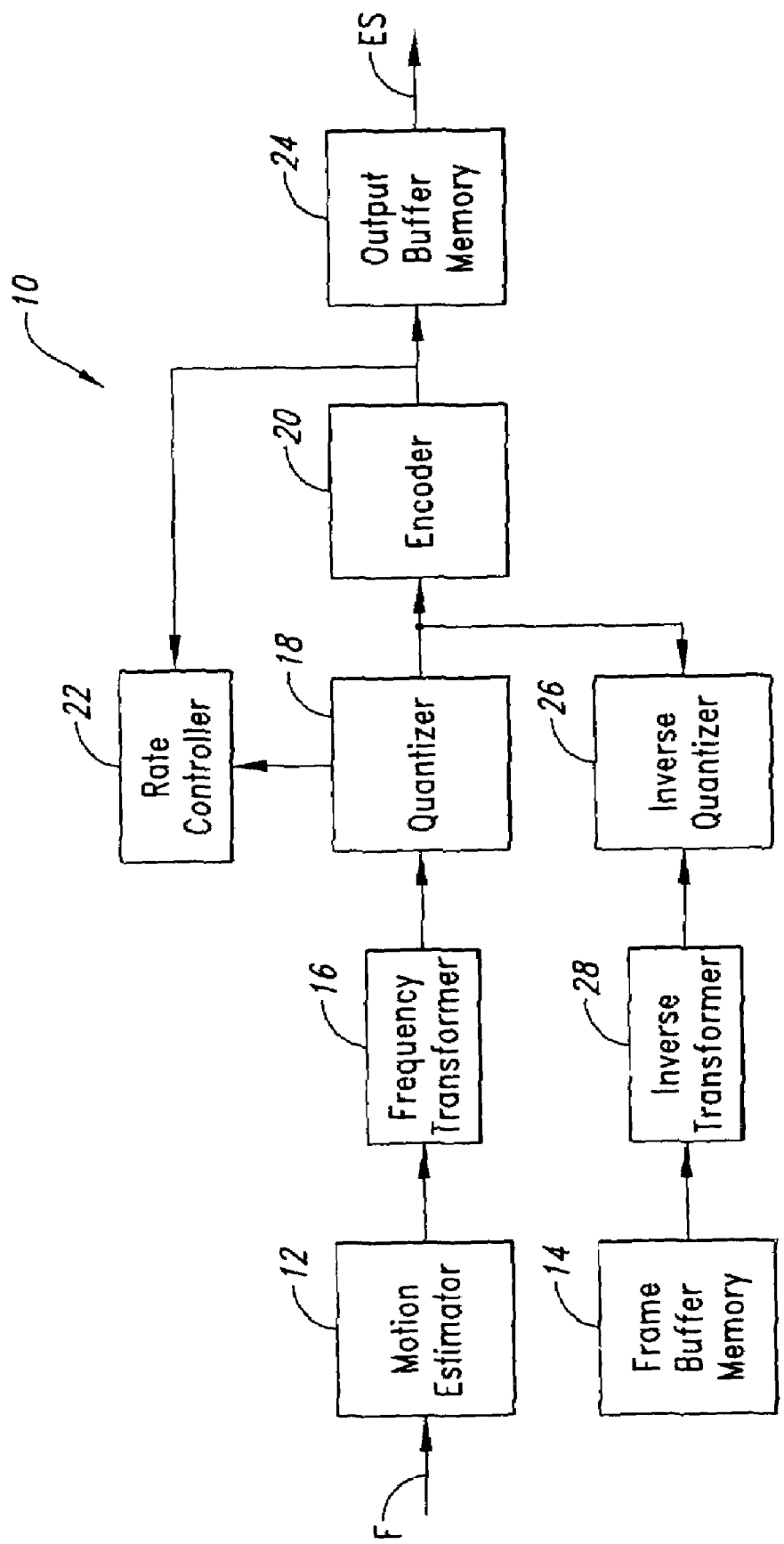
FIGS. 1 to 3, which are in themselves representative both of the prior art and of the solution according to the invention, have already been described previously.
Figure 2:
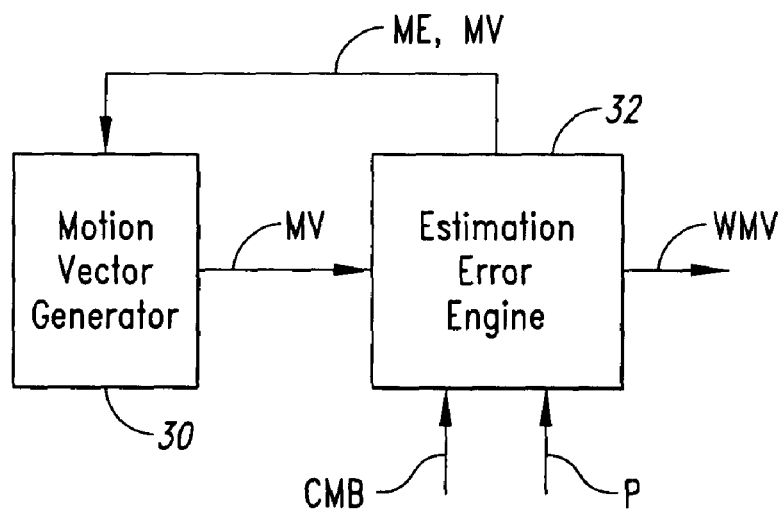
Figure 3:
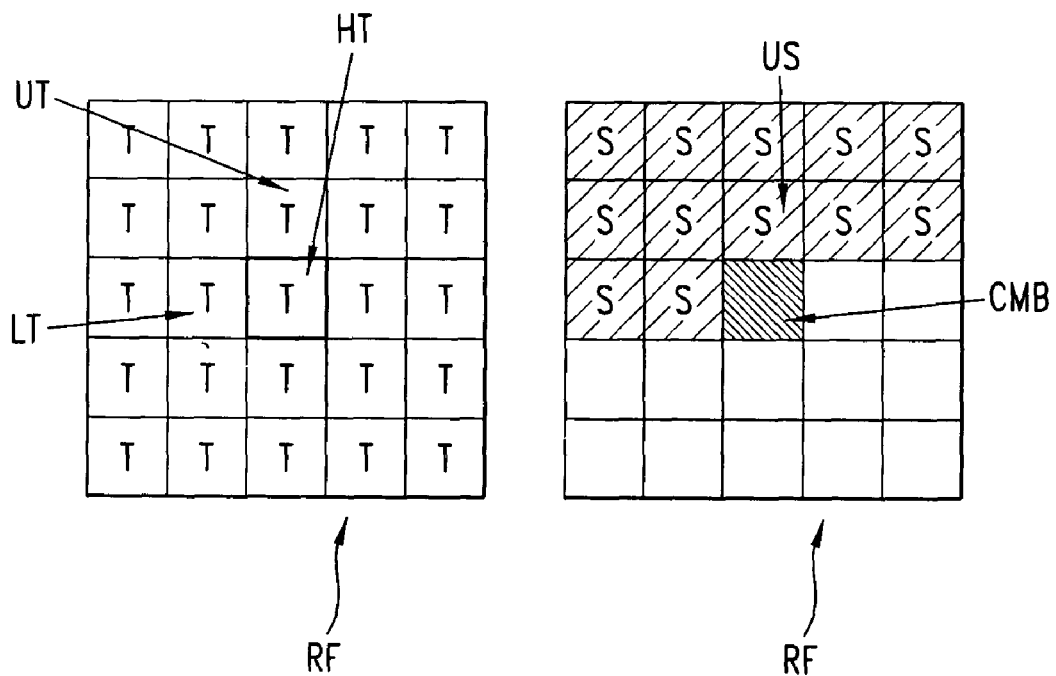
Figure 4:
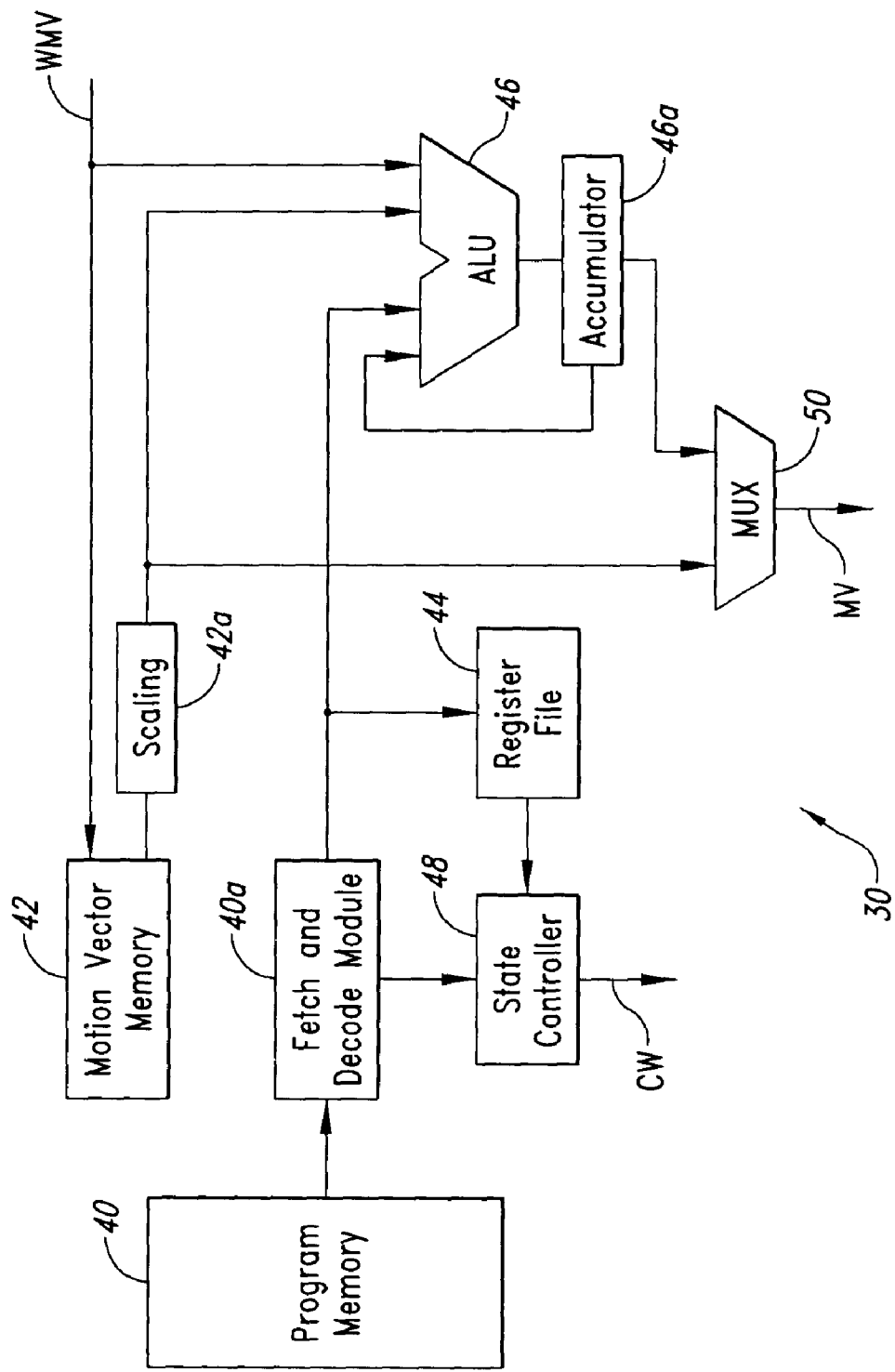
FIG. 4 illustrates, in the form of a block diagram, the general structure of a programmable motion-vector generator according to the invention.

FIG. 4 represents the diagram of a motion-vector generator 30 made according to one embodiment of the invention.

In the above figure, the reference number 40 designates a program memory preferably formed by a RAM memory of the embedded type, which contains a motion-estimation algorithm, written using the set of instructions of the motion-vector generator.

The persons skilled in the art will appreciate that the algorithm in question can be any one of those currently in use (and, in particular, one of those described in the documents already cited previously). Also the modalities of writing said algorithm are to be deemed in themselves known for a person skilled in the sector, and hence such as not to require a detailed description herein.

After a cold reset, the memory 40 can be loaded with any motion-estimation algorithm of a known type, this, of course, provided that the algorithm in question does not require a computational power higher than the intrinsic power of the motion estimator considered as a whole.

The possibility of loading and executing different algorithms confers on the generator according to the invention the required flexibility to enable its adaptation to a wide range of possible applications, from low-power ones to ones with a high level of performance. The algorithm can be executed from start to finish by the motion-vector generator for each macroblock on which motion estimation is to be carried out.

The reference 42 designates, instead, a memory in which the motion vectors resulting from the motion estimation already performed on the macroblocks of one or more reference frames are stored, or on the preceding macroblocks of the current frame. As has been seen, these vectors are referred to, respectively, as temporal predictors and spatial predictors and can be used as reference for motion estimation on the current macroblock. The memory 42 can be divided into two or more independent areas, which can be accessed separately.

If the memory is of too large dimensions to be accommodated locally, it can be located outside and can be accessed using a direct-memory access (DMA) scheme. In this case, a transparent mechanism is used for keeping the most recent vectors inside, in order to enable fast access. This may be achieved typically using a memory structure of the first-in first-out (FIFO) type.

Each motion vector has two components, one for the horizontal direction and one for the vertical direction, and each component is expressed using sub-pixel co-ordinates. The precision may be in the region of half a pixel, quarter of a pixel or even greater, according to the video standard used.

The reference number 44 designates a register file of the motion-vector generator. It is designed to store any information useful for performing estimation of motion correctly on any macroblock of any image of the video sequence. In particular, the file 44 (in effect implemented in the form of a memory) is designed to receive data indicating the following quantities:

width and height of the current frame of the sequence;
current dimensions of the search window corresponding to the current search mode (frame/field, backwards/forward), expressed as maximum and minimum values of each component of the motion vectors;
the number of the current macroblock in the current frame, as well as its horizontal and vertical co-ordinates with respect to the pixel on the top left of the frame; two or more counters may be used for performing an interleaved estimation of motion on two or more macroblocks;
the best results so far found by the engine for calculating estimation error 32 expressed in the form of one or more motion vectors considered as winners (horizontal and vertical components), together with the respective adaptation errors;
a pointer indicating the winning motion vector in the register file, for the mode currently in use;
a counter used for following the number of results for the motion vectors currently received starting from the engine for calculating estimation error 32;
the time difference between the current frame and the reference frame or frames used for scaling the motion vectors (the values are entered from outside);
the state register, which stores the logic result of the comparisons made, according to criteria which will be described in greater detail in what follows, by an arithmetic and logic unit (ALU) designated by 46; its bits are used in particular for indicating the five conditions: "greater than", "less than", "equal to", "greater than or equal to", and "less than or equal to"; and
four general-purpose registers, referred to as reg0, reg1, reg2, reg3, which can be manipulated directly by the user by means of setting instructions.

A register apart is the accumulator, in which a temporary vector is stored, so as to enable operations such as scaling or accumulation to be performed thereon.

Usually, also other registers are present which may be used, for example, for integrating algorithms, so as to enable improvement of motion estimation and performance in terms of video encoding, such as, for example, detection of change of scene, dimensions of the search window of an adaptable type, jumping from one frame to another, temporal reduction of noise, and stabilization of the image.

As has been said, the reference number 46 designates an arithmetic and logic unit (ALU) designed to perform the following functions:

arithmetical addition and subtraction of the motion vectors in order to calculate the new motion vectors using as reference other motion vectors;
logic comparisons between components of motion vectors in order to verify whether there are motion vectors that exceed the limits of the search window at the moment defined;
comparisons of a logic type on adaptation-error values, so as to enable choice of different sets of possible motion vectors to submit to testing according to the estimation error obtained;
calculation of the addresses of the motion-vector memory 42 so as to be able to fetch the correct temporal or spatial predictor using as reference the co-ordinates of the current macroblock CMB; and
addition of the addresses of the program memory for calculating the destination.

The reference number 42a designates a scaling block which performs operations of scaling on the motion vectors coming from the internal memory, according to criteria which will be described in greater detail in what follows.

The reference number 48 designates again a block having the state-control function, which is able to generate a control word used for influencing the behavior of the engine for calculating estimation error designated by 32.

The control word generated by block 48 indicates the following conditions:

type of current frame (I, P, B or other);
whether, with the current motion vector, a new frame has started;
whether, with the current motion vector, a new macroblock has started;
whether the current step is a fine-search step or a coarse-search step (according to the terms defined in EP-A-0 917 363 or EP-A-0 944 245;
whether the search direction is forwards (towards past frames), backwards (towards future frames), or bidirectional (in both directions);

the type of current motion vector MV, which may be either 16×16 (if referred to the entire macroblock), 8×8 (if each macroblock has four motion vectors), or some other;

whether the current motion vector MV is the zero vector;

whether the current motion vector MV is a frame vector or a field vector;

whether the current motion vector MV is not valid for any reason and thus has to be ignored;

whether it is necessary to take the final decision for the current macroblock;

whether the decision must be bypassed;

whether the motion estimator must simply pass the inputs to the outputs as they are; and whether the motion estimator must function as motion compensator.

Some of the above signals, which typically assume the character of flags, are set automatically according to the values of the internal registers. Others are set on the basis of the signal coming from outside. Yet others can be set directly by the user with appropriate instructions.

The arithmetic and logic unit 46 receives at input, on the one hand, the data coming from the program memory 40 (this is done through a fetch-and-decode module 40a) and, on the other hand, the information coming from the memory 42 (this is done through the scaling module 42a).

The arithmetic and logic unit 46 receives at input also the motion vectors considered as being winners WMV, and, according to a general feedback mechanism, the data collected (according to the criteria illustrated in greater detail in what follows) in an accumulator 46a associated to the output of the arithmetic and logic unit 46.

Finally, the reference number 50 designates a multiplexer module designed for generating the motor vectors MV according to the data coming from the memory 42 (via the scaling module 42a) and from the arithmetic and logic unit 46 (via the accumulator 46a).

For the purposes of programming the motion-vector generator, in the currently preferred embodiment of the invention, it is envisaged that the latter will be able to recognize ten different instructions, each encoded with a fixed length equal to 24 bits, the first four of which are used for encoding the function code (opcode with up to 16 possible codes), whilst the remaining 20 are used for the parameters.

The set of instructions comprises the instructions described in what follows.

END (end of program)

| 0×0 | Unused |
|---|---|
| 23   20 | 19   0 |

This instruction indicates that the next one is the last instruction of the program.

ACC (accumulate)

| 0×1 | type | area | x_value | y_value |
|---|---|---|---|---|
| 23   20 | 19   17 | 16   12 | 11   6 | 5   0 |

This instruction operates on the accumulator register 46a, and its behavior depends upon the value of the "type" field.

type=0: reset the accumulator;

type=1: accumulate the vector from the given area of the internal memory of the motion vectors;

type=2: add (x_value, y_value) to the vector contained in the accumulator; the values are expressed in sub-pixel units;

type=3: scale the accumulator using (x_value, y_value) as coefficients; the values are expressed in sub-pixel units;

type=4: issue the current vector in the accumulator.

MEM (memory)

| 0×2 | area | not used | x_coord | y_coord |
|---|---|---|---|---|
| 23   20 | 19   15 | 14   12 | 11   6 | 5   0 |

This instruction indicates that it is necessary to take a motion vector starting from the internal memory and transfer it to the pipeline used. The co-ordinates indicated respectively by x_coord and y_coord indicate the location of the memory vector, with reference to the position of the current macroblock. The effective address of the predictor to be fetched is calculated provided that the dimensions of the frame and the position of the current macroblock CMB are known. The above instructions are stored in the file 44. The motion vectors coming from the memory are scaled according to the scaling factors established by the scaling instruction SCL.

UPD (update)

| 0×3 | not used | DEC | x_coord | y_coord |
|---|---|---|---|---|
| 23   20 | 19   17 | 16   15 | 14   8 | 7   0 |

This instruction generates issuing of a motion vector calculated on the basis of the winning motion vector contained in the internal file of the motion-vector generator 30.

The co-ordinates of the motion vector are calculated in the following way:

$$mv\_x = winner\_x + x\_coord$$

$$mv\_y = winner\_y + y\_coord$$

If the flag DEC is set, the motion-vector generator 30 signals a command to make a decision for the current mode to the engine for calculating estimation error 32. This is obtained by means of a flag on the control word. The current mode is obtained from the control word itself and used for selecting the correct winning motion vector that is to be used starting from the internal memory of the motion vectors.

ABS (absolute)

| 0×4 | x_coord | y_coord |
|---|---|---|
| 23   20 | 19   10 | 9   0 |

This instruction generates issuing of a motion vector, the components of which are encoded in two parameters of the instruction itself. If both of the co-ordinates are equal to zero, the controller of the motion vectors MV fixes the flag in the control word since the zero motion vector is treated in a special way by different video encoders.

SSV (synchronize and store vector)

| 0×5 | F1 | F2 | not used | x_coord | y_coord |
|---|---|---|---|---|---|
| 23   20 | 19   18 | 17   13 | 12   8 | 7   0 | |

This instruction synchronizes the motion-vector-generator stage 30 with the stage 32 that functions as engine for calculating estimation error, and stores the vectors in the memory. Its behavior depends upon the flags F1 and F2.

If the flag F1 is set, the synchronization operation is performed. In this case, the motion-vector generator 30 stops execution of the program until the number of the vectors received starting from the engine for calculating estimation error is equal to the value of the "count" field.

If the flag F2 is set, the last vector received is stored in the selected area of the internal memory and in the selected position (given by the "winner" field) of the area corresponding to the winner in the register file. The two flags can be set at the same time.

CMP (compare)

| 0×6 | value | threshold |
|---|---|---|
| 23  20 | 19      16 | 15     0 |

This instruction compares the value indicated in the "value" field with the number contained in the "threshold" field. The results of the comparison are stored in the state register. The value to be compared is chosen as follows:
 value=0: the value is the estimation error (for example, the mean absolute error MAE) of the winner selected;
 value=1 to 4: the value is the contents of the general-purpose registers reg0-reg3;
 value=5 to 8: the value is the contents of the general-purpose registers reg0-reg3, plus the number of the current macroblock;

JMP (jump)

| 0 × 7 | type | address |
|---|---|---|
| 23  20 | 19        15 | 14        0 |

This instruction executes a jump to the address indicated. Its behavior depends upon the value of the "type" field as follows:
 1. unconditioned jump
 2. jump if greater than
 3. jump if equal to
 4. jump if less than
 5. jump if less than or equal to
 6. jump if the type of image is I
 7. jump if the type of image is P
 8. jump if the type of image is B The values 9 to 15 are reserved for possible future uses. The conditions 1 to 5 are subjected to comparison starting from contents of the state register, whilst the indication for the type of image comes from outside.

SCL (scale)

| 0 × 8 | not used | F1 | x_scale | F2 | y_scale |
|---|---|---|---|---|---|
| 23  20 | 19    12 | 11 | 10    6 | 5 | 4    0 |

This instruction establishes the scaling factors for the co-ordinates x and y of any subsequent motion vector that is issued. If the flag F1 (or F2) is not set, then the x_scale factor (or y_scale factor) is an "absolute" scaling factor. If, instead, it is set, the scaling factor is relative to the time distance starting from the reference frame, which may be forwards or backwards according to the flags of the control word. In other words, the formula is:

$$mv\_scale(x)=x\_scale+F1\times T\_dist[forward|backward]$$
[x]

$$mv\_scale(y)=y\_scale+F2\times T\_dist[forward|backward]$$
[y]

Any motion vector coming form the memory can then be scaled according to the formula $$mv[x|y]=mv[x|y]\times mv\_scale[x|y]$$

The scaling factors have a sub-pixel precision.

SET (set)

| 0×9 | type | data |
|---|---|---|
| 23  20 | 19      16 | 15     0 |

The behavior of this instruction depends upon the value of the "type" field.
 0. set the control-word bit (top part) using the data field as mask;
 1. reset the control-word bit (top part) using the data field as mask;
 2. set the control-word bit (bottom part) using the data field as mask;
 3. reset the control-word bit (bottom part) using the data field as mask;
 4. write the data field in the control word (top part);
 5. write the data field in the control word (bottom part);
 6-9. add the data field to reg0-reg3;
 10-13. write the data field in reg0-reg3;
 14-15. reserved.

Figure 5:
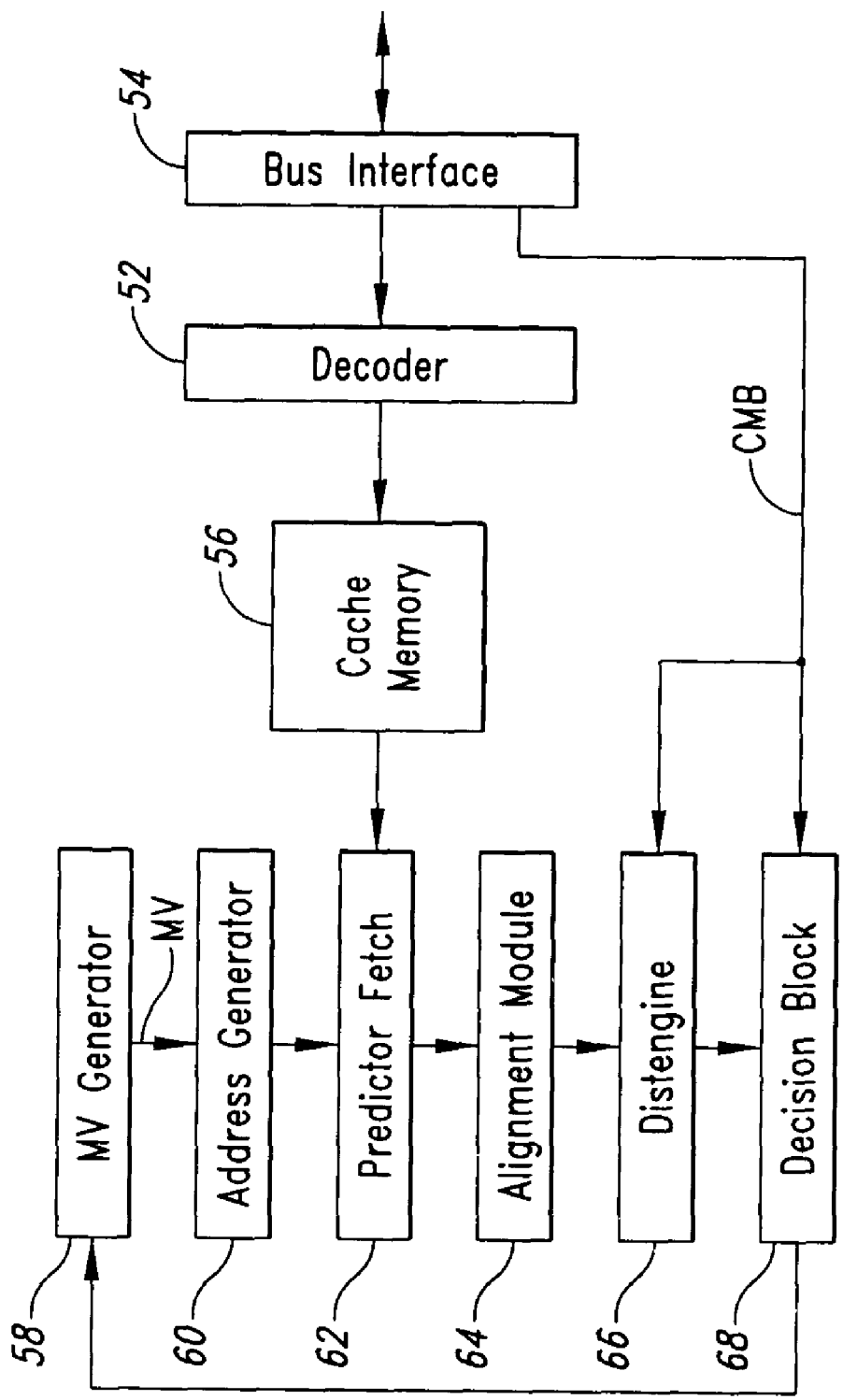
FIG. 5 illustrates the possible structure of a hardware engine that can be used together with the solution according to the present invention in an MPEG-4 application.

The solution according to the invention may be advantageously integrated in the "Slimpeg Hardware Engine for MPEG-4" device recently developed by STMicroelectronics Srl, which is the assignee of the present application. This is a motion-estimating subsystem with low power absorption for MPEG-4 encoding. The corresponding architecture, reproduced in FIG. 5, is articulated around a decoder 52 of the type called REMPEG50 (see, in this connection, the publication by R. Burger and D. Pau "Rempeg50 encoder/decoder. User manual", dating back to March 1999, which is incorporated herein by reference), which decompresses the data coming from the frame buffer memory. These data are compressed in order to reduce the overall memory demands.

The decoder 52 is supplied with the data for the predictors coming from a bus interface 54 and supplies its output to a cache memory 56, which stores the data on the predictors coming from the main memory locally. In the diagram illustrated in FIG. 5, the reference number 58 designates the programmable motion-vector generator. This generates the motion vectors that are to be tested, for example, via the Slimpeg algorithm cited previously.

The motion vectors generated in the module 58 are transferred to a generator of addresses 60, which generates the physical memory addresses corresponding to the predictor to which the motion vector each time considered is pointing. The generator 60 supplies the module 62 which performs the predictor-fetch function, i.e., the function of fetching the data of the predictor from the frame buffer memory. This is done via the cache memory 56.

The results of the fetch action performed in the module 62 undergo alignment in an alignment module 64 designed for aligning the data in such a way as to form the final predictor on a 16×16 pixel format.

The set of data thus obtained is transferred to a module 66 with distengine function, designated by the reference number 56, which calculates the indicative magnitude of the error (typically SAD) between the predictor and the current macroblock. The result of the operation performed by the distengine module 66 is supplied to a decision block 68, which stores the partial results up to the end of the macroblock period, and then chooses the motion vector considered best with its associated predictor, supplying said result to the generator 58.

Figure 6:
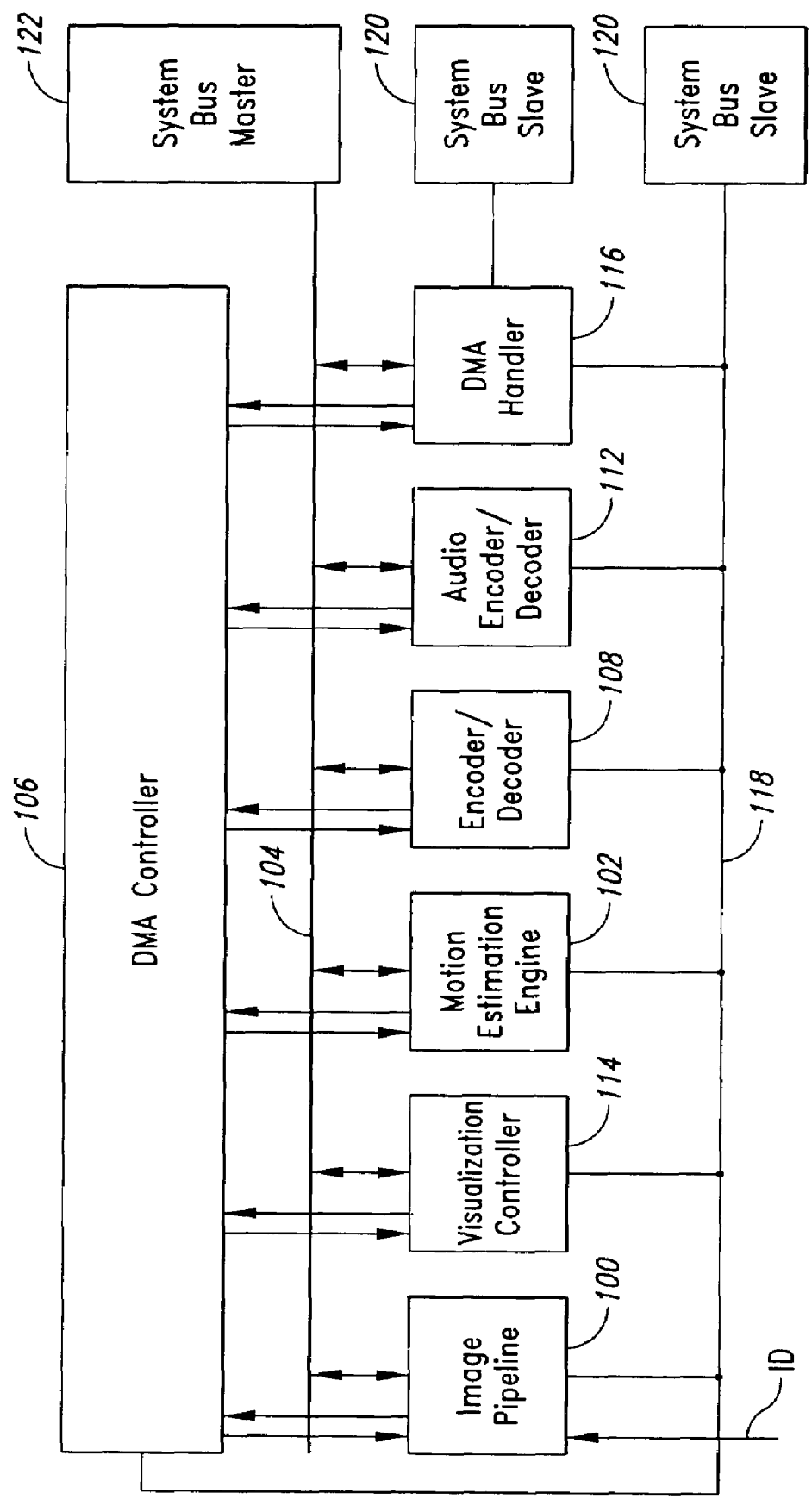
FIG. 6 illustrates a corresponding MPEG-4 encoding/decoding structure.

FIG. 6 reproduces, in the form of a block diagram, the structure of an audio/video encoder for mobile devices. The solution described integrates a slimpeg hardware engine for MPEG-4 applications (in brief, SHE4M4) in the form of a motion-estimation subsystem containing within it the programmable motion-vector generator.

In summary, the image data ID coming from a sensor (typically a video sensor) are treated by a pipeline for generating the images 100 and are supplied to the hardware engine SHE4M4, designated as a whole by 102, via a local bus 104. The engine 102 accesses the frame buffer memory via a DMA controller 106, so as to receive the data on the predictors. The results of the motion-estimation process (i.e., the motion vectors, as well as the data for the current macroblock and the predictors) are sent directly to the video encoding/decoding system 108 via a dedicated control bus.

For reasons of completeness, in the diagram of FIG. 6 there are also represented the audio encoder/decoder 112 . . . , the visualization control module (PPP) 114, as well as the module 116 which sees to handling the compressed data and the FIFO codes for the DMA controller 106.

The reference number 118 designates a further bus, which enables dialogue with the slave unit for communication with the system bus, designated by 120.

Finally, the reference number 122 designates the master unit for communication with the system bus.

Of course, without prejudice to the principle of the invention, the details of implementation and the embodiments may vary widely with respect to what is described and illustrated herein, without thereby departing from the scope of the present invention as defined in the annexed claims.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The invention claimed is:

1. A system for generating motion vectors in the framework of a motion estimator, the system being configured for co-operating with an engine for calculating estimation error for generating motion vectors according to estimation errors and/or motion vectors previously generated, the system comprising:

a program memory that contains program data for a motion-estimation algorithm to be executed;

a motion-vector memory that contains data identifying said motion vectors previously generated; and an arithmetic and logic unit co-operating with said program memory and said motion-vector memory, said arithmetic and logic unit being configured for performing at least one function comprised in the group consisting of:

arithmetical addition and subtraction of motion vectors in order to calculate new motion vectors using as reference said motion vectors previously generated;

definition of a current search window and logic comparisons on components of said motion vectors for verifying whether certain motion vectors exceed the limits of said search window;

logic comparisons on values of said estimation errors referred to different sets of motion vectors to be subjected to checking;

calculation of addresses of said memory of the motion vectors; and addition of addresses of said program memory, wherein said progarm memory stores a set of instructions including:

an end of program instruction indicating that a next instruction of a program is the last instmction of the program;

an accumulate instruction operating on an accumulator register;

a memory instruction that transfers a motion vector from the motion-vector memory to a pipeline;

an update instruction generating issuing of a motion vector calculated based on a winning motion vector contained in the motion-vector memory;

an absolute instruction generating issuing of a motion vector;

a synchronize and store vector instruction synchronizing a motion-vector-generator stage with the engine for calculating estimation error;

a compare instruction;

a jump instruction executing a jump to a given address;

a scale instruction establishing scaling factors for co-ordinates of any subsequent motion vector that is issued; and a set instruction having a behavior that depends upon a value of a "type" field.

2. The system according to claim 1, further comprising loading means for loading into said motion-vector memory data identifying motion vectors previously generated following upon motion estimation performed:

on the macroblocks of one or more reference frames, the motion vectors thus generated being referred to as temporal predictors; and on the previous macroblocks of the current frame, the corresponding motion vectors thus generated being referred to as spatial predictors.

3. The system according to claim 2, wherein said motion-vector memory comprises memory locations for storing, for each motion vector, a component for the horizontal direction and a component for the vertical direction, each component preferably being expressed in the form of sub-pixel co-ordinates.

4. The system according to claim 2 wherein said motion vector memory is organized in a plurality of independent areas, which can be separately accessed.

5. The system according to claim 4, wherein said motion-vector memory is at least partially located outside the system.

6. The system according to claim 1 wherein said arithmetic and logic unit is configured to carry out said calculation of the addresses of the motion-vector memory, fetching the correct temporal or spatial predictor, using as reference the co-ordinates of the current macroblock.

7. The system according to claim 1, further comprising a register-file module comprising at least one counter for following the number of the motion vectors so far generated for the current macroblock and the number of the partial results received from said engine for calculating estimation error.

8. The system according to claim 1, further comprising a register-file module with signals of data stored indicating at least one of the following values:
   width of the current frame of the sequence;
   height of the current frame of the sequence;
   current dimension of the search window, defined as maximum and minimum values of each component of the motion vectors;
   number of the current macroblock in the current frame;
   co-ordinates of the current macroblock within the current frame;
   motion vectors corresponding to the current optimal value of the estimation error calculated by said engine for calculating estimation error;
   pointer indicating the motion vector considered to be optimal;
   time distance between the current frame and the reference frame or frames; and
   logic result of the comparisons made in said arithmetic and logic unit.

9. The system according to claim 1, further comprising an accumulator register, associated with said arithmetic and logic unit, for temporary storage of a motion vector that is to be processed in view of its being issued.

10. The system according to claim 1, further comprising a scaling module, between said motion-vector memory and said arithmetic and logic unit, for scaling the values of the motion vectors transferred form said memory to said arithmetic and logic unit.

11. The system according to claim 1, further comprising a state-control block for controlling operation of said engine for calculating estimation error by means of the generation of control-word signals identifying at least one of the following conditions:
   type of current frame;
   start of a new frame with the current motion vector;
   start of a new macroblock with the current motion vector;
   coarse or fine search for the motion vector;
   type of current motion vector;
   correspondence of the current motion vector with the zero vector;
   character identifying the frame or the field of the current motion vector;
   invalidity of the current motion vector;
   need to take a final decision for the current macroblock;
   possibility of getting round the decision on the current macroblock;
   need to perform a simple transfer of the input data to the output; and
   need to operate as motion compensator.

12. The system according to claim 11, wherein said control-word signals are generated by said state-control block in the form of flags.

13. The system according to claim 1 wherein said arithmetic and logic unit is selectively configurable in a plurality of operating conditions for generating motion vectors, said plurality of operating conditions corresponding to the following operating conditions:
   generation of motion vectors as predictors deriving from a motion estimation already performed on the macroblocks of the reference frame or on the preceding macroblocks of the current frame;
   generation of said motion vectors in the form of updates calculated using the co-ordinates of the motion vectors already generated for the current macroblock, with the addition thereto of a relative displacement; and
   generation of said motion vectors as absolute motion vectors generated as such, by fetching the corresponding components from the program code.

14. A system for generating motion vectors, comprising:
   an estimation error engine for calculating estimation error according to estimation errors and/or motion vectors previously generated; and
   a motion estimation engine coupled to the estimation error engine and including:
   a program memory that contains program data for a motion estimation algorithm to be executed;
   a motion-vector memory that contains data identifying said motion vectors previously generated;
   an arithmetic and logic unit co-operating with said program memory and said motion-vector memory, said arithmetic and logic unit being configured use the program data to calculate new motion vectors using as reference said motion vectors previously generated; and
   a state controller coupled to the program memory and the error estimation engine and configured to control the error estimation by the error estimation engine based on the program data stored in the program memory, wherein said program memory stores a set of instructions including:
   an end of program instruction indicating that a next instruction of a program is the last instruction of the program;
   an accumulate instruction operating on an accumulator register;
   a memory instruction that transfers a motion vector from the motion-vector memory to a pipeline;
   an update instruction generating issuing of a motion vector calculated based on a winning motion vector contained in the motion-vector memory;
   an absolute instruction generating issuing of a motion vector;
   a synchronize and store vector instruction synchronizing the motion estimation engine with the estimation error engine;
   a coin tire instruction;
   a jump instruction executing to a given address;
   a scale instruction establishing scaling factors for co-ordinates of any subsequent motion vector that is issued; and
   a set instruction having a behavior that depends upon a value of a "type" field.

15. The system according to claim 14, further comprising loading means for loading into said motion-vector memory data identifying motion vectors previously generated following upon motion estimation performed:
   on the macroblocks of one or more reference frames, the motion vectors thus generated being referred to as temporal predictors; and
   on the previous macroblocks of the current frame, the corresponding motion vectors thus generated being referred to as spatial predictors.

16. The system according to claim 15 wherein said arithmetic and logic unit is configured to carry out a calculation of addresses of the motion-vector memory, fetching a correct one of the temporal and spatial predictors, using co-ordinates of a current macroblock.

17. The system according to claim 14, farther comprising a register-file module comprising a counter for following the number of the motion vectors so far generated for a current macroblock and the number of the partial results received from said estimation error engine.

18. The system according to claim 14 wherein the state controller is structured to generate of control-word signals identifying at least one of the following conditions:
- type of current frame;
- start of a new frame with the current motion vector;
- start of a new macroblock with the current motion vector;
- coarse or fine search for the motion vector;
- type of current motion vector;
- correspondence of the current motion vector with the zero vector;
- character identifying the frame or the field of the current motion vector;
- invalidity of the current motion vector;
- need to take a final decision for the current macroblock;
- possibility of getting round the decision on the current macroblock;
- need to perform a simple transfer of the input data to the output; and
- need to operate as motion compensator.

19. The system according to claim 14 wherein said arithmetic and logic unit is selectively configurable in a plurality of operating conditions for generating motion vectors, said plurality of operating conditions corresponding to the following operating conditions:
- generation of motion vectors as predictors deriving from a motion estimation already performed on the macroblocks of the reference frame or on the preceding macroblocks of the current frame;
- generation of said motion vectors in the form of updates calculated using the co-ordinates of the motion vectors already generated for the current macroblock, with the addition thereto of a relative displacement; and
- generation of said motion vectors as absolute motion vectors generated as such, by fetching the corresponding components from the program code.

20. A method of generating motion vectors, comprising:
   calculating estimation error according to estimation errors and/or motion vectors previously generated; and
   storing in a program memory program data for a motion estimation algorithm to be executed;
   storing in a motion-vector memory data identifying said motion vectors previously generated;
   providing instructions from the program memory to an arithmetic and logic unit co-operating with said program memory to cause said arithmetic and logic unit to calculate new motion vectors using as reference said motion vectors previously generated; and
   controlling the calculation of the error estimation by the error estimation engine based on the program data stored in the program memory, wherein said program memory stores a set of instructions inclining:
   an end of program instruction indicating that a next instruction of a program is the last instruction of the program;
   an accumulate instruction operating on an accumulator resister;
   a memory instruction that transfers a motion vector from the motion-vector memory to a pipeline;
   an update instruction generating issuing of a motion vector calculated based on a winning motion vector contained in the motion-vector memory;
   an absolute instruction generating issuing of a motion vector;
   a synchronize and store vector instruction synchronizing the motion estimation engine with the estimation error engine;
   a compare instruction;
   a jump instruction executing a jump to a given address;
   a scale instruction establishing scaling factors for co-ordinates of any subsequent motion vector that is issued; and
   a set instruction having a behavior that depends upon a value of a "type" field.

21. The method of claim 20, wherein the step of storing in the motion-vector memory includes loading into said motion-vector memory data identifying motion vectors previously generated following upon motion estimation performed:
   on macroblocks of one or more reference frames; and
   on previous macroblocks of a current frame.

* * * * *

UNITED STATES PATENT AND TRADEMARK OFFICE
CERTIFICATE OF CORRECTION

PATENT NO. : 7,272,184 B2  Page 1 of 1
APPLICATION NO. : 10/456985
DATED : September 18, 2007
INVENTOR(S) : Alfonso et al.

It is certified that error appears in the above-identified patent and that said Letters Patent is hereby corrected as shown below:

Column 14

Line 43, "a coin tire instruction;" should read as -- a compare instruction; --

Line 44, "a jump instruction executing to a given address;" should read as -- a jump instruction executing a jump to a given address; --

Signed and Sealed this

Seventeenth Day of June, 2008

JON W. DUDAS
*Director of the United States Patent and Trademark Office*